United States Patent
Nihei et al.

(10) Patent No.: US 8,054,027 B2
(45) Date of Patent: Nov. 8, 2011

(54) ROBOT OPERATING RANGE SETTING DEVICE

(75) Inventors: Ryo Nihei, Yamanashi (JP); Tetsuaki Kato, Yamanashi (JP); Takeaki Aramaki, Yamanashi (JP); Tomoyuki Yamamoto, Yamanashi (JP)

(73) Assignee: FANUC Ltd, Minamitsuru-Gun, Yamanashi (JP)

( * ) Notice: Subject to any disclaimer, the term of this patent is extended or adjusted under 35 U.S.C. 154(b) by 616 days.

(21) Appl. No.: 12/230,853

(22) Filed: Sep. 5, 2008

(65) Prior Publication Data
US 2009/0091286 A1    Apr. 9, 2009

(30) Foreign Application Priority Data

Oct. 5, 2007  (JP) .................................. 2007-262436

(51) Int. Cl.
*B25J 9/18* (2006.01)
(52) U.S. Cl. .............. 318/568.11; 318/560; 318/568.12; 318/568.13; 901/8; 901/19; 901/23
(58) Field of Classification Search .................. 318/560, 318/568.11, 568.12, 568.13, 568.16, 568.18, 318/568.2, 568.22; 700/245; 901/8, 19, 901/21, 23, 27, 49
See application file for complete search history.

(56) References Cited

U.S. PATENT DOCUMENTS

| | | | | |
|---|---|---|---|---|
| 5,956,465 A * | 9/1999 | Takagi et al. | .................. | 700/255 |
| 6,124,693 A * | 9/2000 | Okanda et al. | ........... | 318/568.11 |
| 6,463,358 B1 * | 10/2002 | Watanabe et al. | ............. | 700/253 |
| 6,657,156 B2 * | 12/2003 | Kubota et al. | ............. | 219/121.63 |
| 6,826,450 B2 * | 11/2004 | Watanabe et al. | ............. | 700/245 |
| 7,282,882 B2 * | 10/2007 | Kitatsuji et al. | ........... | 318/568.11 |
| 7,558,647 B2 * | 7/2009 | Okazaki | ........................ | 700/260 |
| 2005/0055134 A1 * | 3/2005 | Okuda et al. | .................. | 700/245 |

FOREIGN PATENT DOCUMENTS

| | | |
|---|---|---|
| JP | 6-246674 | 9/1994 |
| JP | 7-121215 | 5/1995 |
| JP | 2002331478 | 11/2002 |

OTHER PUBLICATIONS

Japanese Notice of Reasons for Rejection mailed Jan. 27, 2009 issued in Japanese Application No. 2007-262436 (including a partial translation thereof).

* cited by examiner

*Primary Examiner* — Walter Benson
*Assistant Examiner* — Antony M Paul
(74) *Attorney, Agent, or Firm* — Drinker Biddle & Reath LLP

(57) ABSTRACT

A robot control unit (30) comprises: a setting means (40) for setting operating ranges of each shaft and a working tool of the robot (20); a storage means (33) for storing an inertial running distance of the robot decided by at least one of the operating speed of the robot and the weight of the working tool; and an arriving range calculation means (36) for calculating an arriving range to which the robot arrives according to the operating range, which has been set by the setting means, and the inertial running distance stored by the storage means. Due to the foregoing, while consideration is being given to the inertial running distance of a robot, the arriving range of the robot is made. Further, a display means (41) for displaying the arriving range may be provided. In the case where each shaft of the robot and the working tool deviate from the operating range, a stopping means (34) for stopping the robot may be provided.

4 Claims, 6 Drawing Sheets

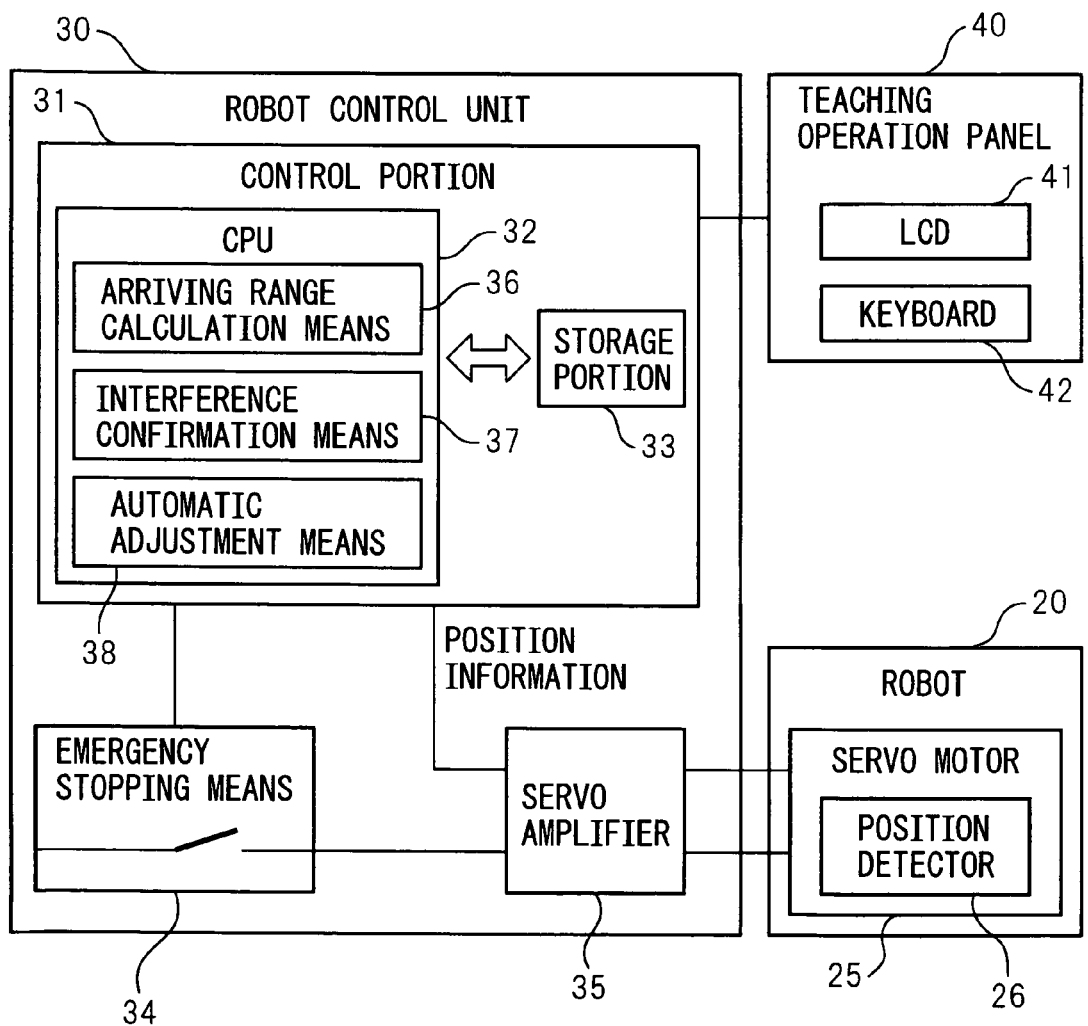

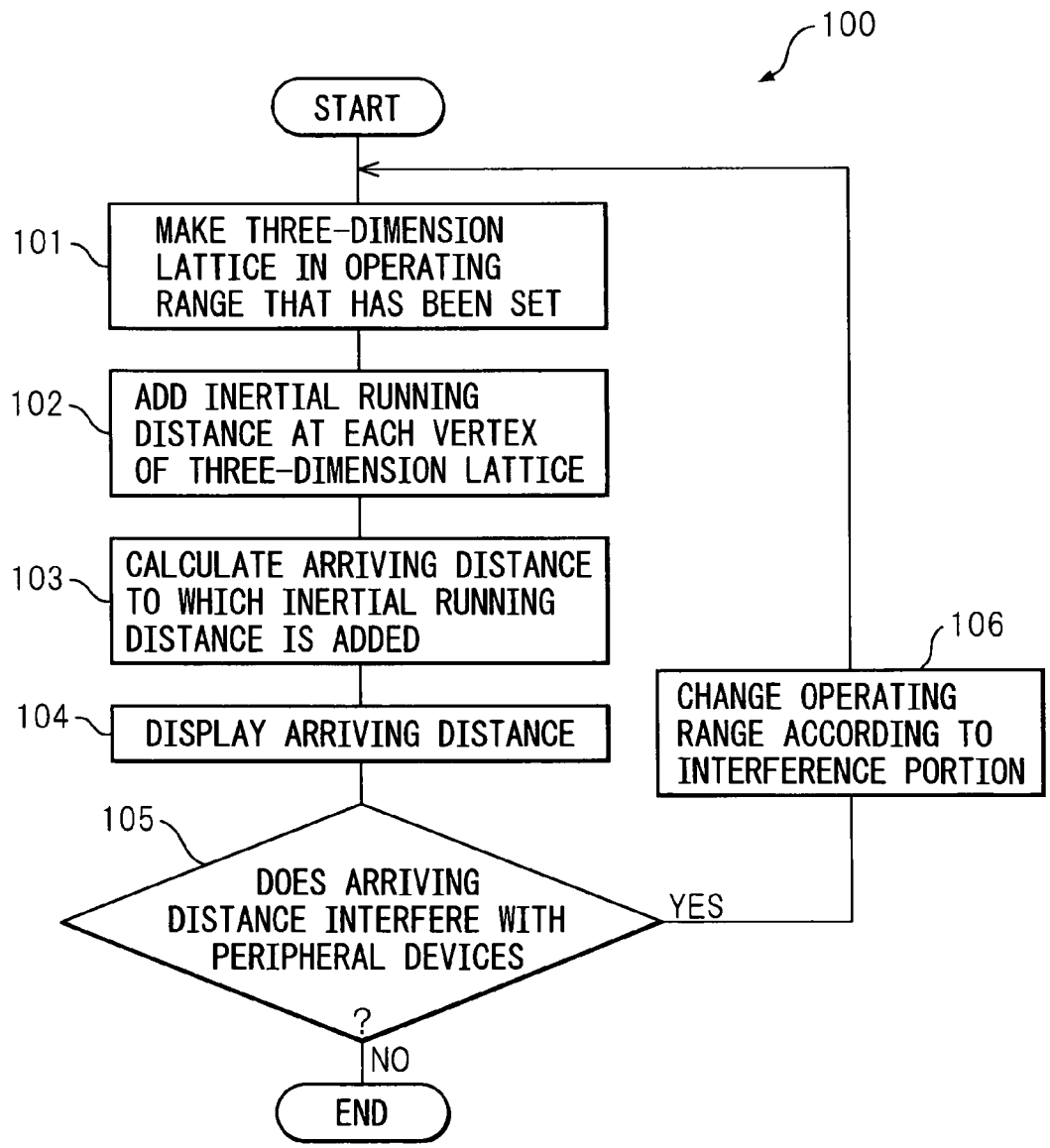

ROBOT OPERATING RANGE SETTING DEVICE

RELATED APPLICATION DATA

This application claims priority under 35 U.S.C. §119 and/or §365 to Japanese Application No. 2007-262436, filed Oct. 5, 2007, the entire contents of which are incorporated herein by reference.

BACKGROUND OF THE INVENTION

1. Field of the Invention

The present invention relates to a robot operating range setting device for setting an operating range of an industrial robot which will be referred to as a robot hereinafter.

2. Description of the Related Art

In factories, etc., robots are used to carry out various work under the condition that working tools are attached to the hands. Alternatively, in some cases, robots execute various work under the condition that the hands of the robots hold workpieces. At the time of executing work as described above, it is necessary to prevent the working tools and others from interfering with peripheral devices of the robots. Japanese Unexamined Patent Publication No. 7-121215 discloses a method in which an operation range of the working tool is set so that the working tool cannot interfere with the peripheral devices.

In this connection, a robot control unit is usually provided with an operating range monitoring function. In the case where each shaft of the robot or a forward end portion of the tool operates deviating from a respectively set operation range, electric power supplied to a motor of the robot is shut off by this operating range monitoring function and the robot is stopped. As a result, each shaft or the working tool of the robot is prevented from colliding with peripheral devices.

However, even after electric power supply to the motor of the robot has been shut off, each shaft of the robot slightly runs by inertia. Accordingly, a position at which the robot stops deviates from the operating range, which is set for each shaft, by a distance of inertial running. By this inertial running, each shaft of the robot collides with the peripheral devices.

Therefore, it is required that the operating range of the robot be smaller than an actual arriving range while considering the inertial running distance. However, since this inertial running range various by an operating speed of the robot and/or a load weight of the working tool, it is difficult for an operator to set the operating range while estimating an actual arriving range. Therefore, it takes a lot of time for the operator to set the operating range. Further, in the method disclosed in Japanese Unexamined Patent Publication No. 7-121215, no consideration is given to such an inertial running distance.

The present invention has been accomplished in view of the above circumstances. It is an object of the present invention to provide a robot operating range setting device capable of making a robot arriving range in which consideration is given to an inertial running distance of the robot.

SUMMARY OF THE INVENTION

In order to accomplish the above object, the first aspect provides a robot operating range setting device comprising: a setting means for setting operating ranges of each shaft and a working tool of the robot; a storage means for storing an inertial running distance of the robot decided by at least one of the operating speed of the robot and the weight of the working tool; and an arriving range calculation means for calculating an arriving range to which the robot arrives according to an operating range, which has been set by the setting means, and an inertial running distance stored by the storage means.

In the first aspect, it is possible to make an arriving range of the robot, in which consideration is given to an inertial running distance, by the arriving range calculation means. As a result, an operator can adjust an operating range of the robot, which has been once set, according to the arriving range that has been made above.

According to the second aspect, the robot operating range setting device of the first aspect further comprises a display means for displaying an arriving range calculated by the arriving range calculation means.

In the second aspect, it is possible for an operator to refer to an arriving range displayed by the display means. Accordingly, the operating range can be easily adjusted.

According to the third aspect, the robot operating range setting device of the first or second aspect further comprises an interference confirmation means for confirming whether or not interference is caused between the arriving range calculated by the arriving range calculation means and the peripheral devices of the robot.

In the third aspect, before the robot is actually operated, it is possible to confirm whether the interference is caused or not. Therefore, the operating range can be easily adjusted. As a result, it is possible to avoid collision of the working tool and others of the robot with the peripheral devices.

According to the fourth aspect, the robot operating range setting device of the third aspect further comprises an adjustment means for adjusting operating ranges of each shaft and the working tool of the robot so as to remove the interference in the case where the interference confirmation means has confirmed the existence of the interference between the arriving range and the peripheral devices.

In the fourth aspect, it is possible to make an operating range in which no interference with the peripheral devices is caused. As a result, it is unnecessary for an operator to adjust an operating range which has been once set.

From the detailed explanations of the typical embodiment of the present invention shown in the attached drawings, objects, characteristics and advantages of the present invention will become clearer.

BRIEF DESCRIPTION OF THE DRAWINGS

FIG. 2 is a schematic diagram of the robot system shown in FIG. 1.

FIG. 3 is a flow chart showing an action of a robot control unit of the present invention.

DETAILED DESCRIPTION

Figure 1:
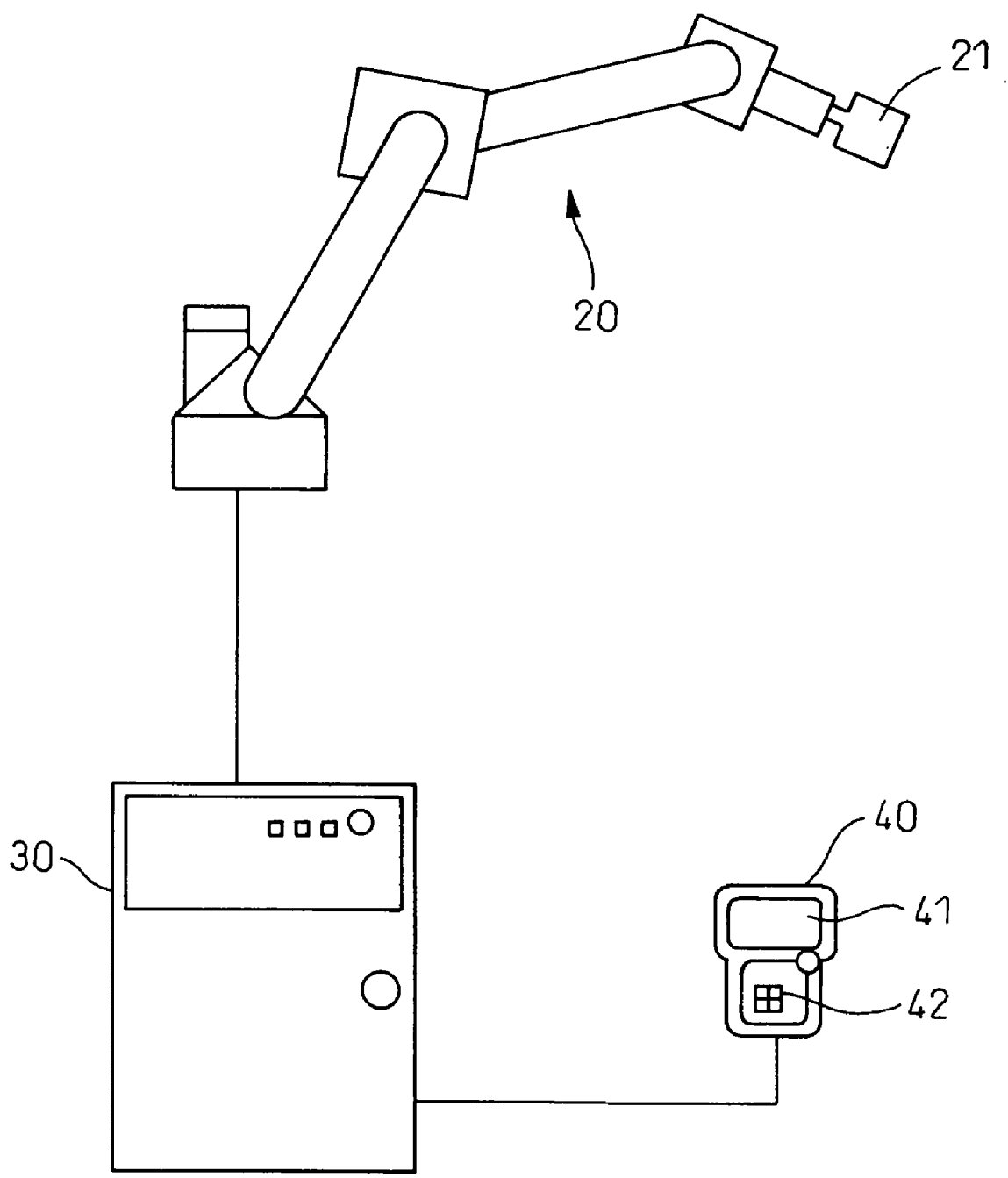
FIG. 1 is a schematic diagram of a robot system having a robot control unit of the present invention.

Referring to the accompanying drawings, an embodiment of the present invention will be explained below. In the drawings, like reference marks are used throughout to designate identical elements. In order to facilitate understanding, the scale has been appropriately reduced.

FIG. 1 is a schematic diagram of a robot system having a robot control unit of the present invention. The robot 20 shown in FIG. 1 is a vertical articulated robot, the degree of freedom of which is 6. The working tool 21 is attached at a forward end portion of the arm of this robot 20. Alternatively, instead of the working tool 21, a hand (not shown) for holding a workpiece may be attached at the forward end portion of the arm of this robot 20.

The teaching control panel 40 having a LCD 41 and a keyboard 42 is connected to the robot control unit 30 for controlling the robot 20. An operator can inspect information inside the robot control unit 30 through LCD 41. Further, the operator can input and change various programs and various data of the robot control unit 30 through the keyboard 42 of the teaching control panel 40.

Specifically, the operator can input and change an operating range of each shaft of the robot 20 and an operating range of a forward end portion of the working tool 21 through the keyboard 42. The operating range of each shaft of the robot 20 and the operating range of a forward end portion of the working tool 21 will be simply referred to as an "operating range." Further, the operator can input and change an inertial running distance h, data of dimensions of the arm of the robot 20, data of dimensions of accessories of the robot 20 and data of dimensions of the peripheral devices 50 through the keyboard 42. In this connection, thus inputted various data are stored in the storage portion 33 of the robot control unit 30.

FIG. 2 is a schematic diagram of the robot system shown in FIG. 1. As shown in FIG. 2, the robot control unit 30 includes a control portion 31 having CPU 32 and a storage portion 33, for example, the robot control unit 30 includes a digital computer. In the embodiment shown in FIG. 2, CPU 32 functions as a robot operating range setting device. CPU 32 includes: an arriving range calculation means 36 for calculating an arriving range X1 at which each shaft of the robot 20 and a forward end portion of the working tool 21 arrives; an interference confirmation means 37 for confirming whether or not the calculated arriving range X1 and the peripheral devices 50 interfere with each other; and an automatic adjustment means 38 for adjusting the operating range X0 so as to remove of interference. In this connection, the arriving range X1, at which each shaft of the robot 20 and the forward end portion of the working tool 21 arrive, will be referred to as an arriving range X1.

Various data inputted by the teaching control panel 40 are stored in the storage portion 33 of the robot control unit 30. The storage portion 33 includes: ROM in which various system programs are accommodated; RAM used to temporarily store data by CPU 32; and a non-volatile memory in which various programs related to the operation of the robot, the related setting values and the maps described later are accommodated.

The servo motor 25 provided in the arm of the robot 20 has a position detector 26, for example, an encoder. The position detector 26 detects a position of a rotary shaft of the servo motor 25 and transmits the positional information to the control portion 31 through the servo amplifier 35. The servo amplifier 35 supplies electric power to the servo motor 25 of the robot 20. Further, as shown in FIG. 2, the robot control unit 30 includes an emergency stopping means 34 for shutting off electric power supply to the servo amplifier 35 by a command given from the control portion 31. This emergency stopping means 34 has an operation monitoring function.

Figure 4A:
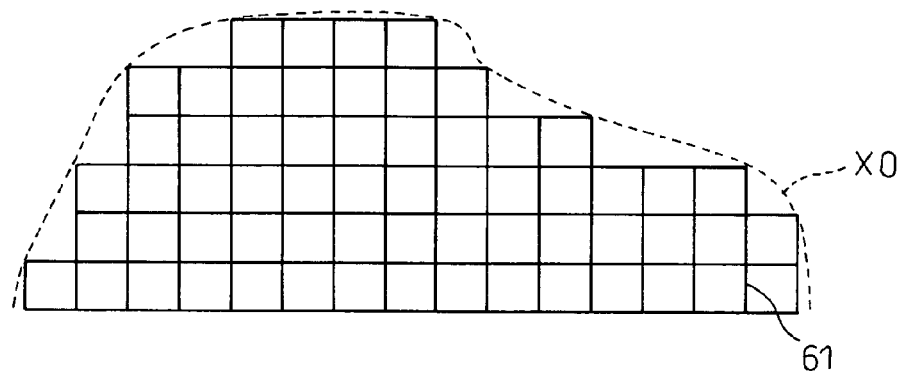
FIG. 4a is a first view explaining a calculation method of calculating an arriving range from an operating range.
Figure 4B:
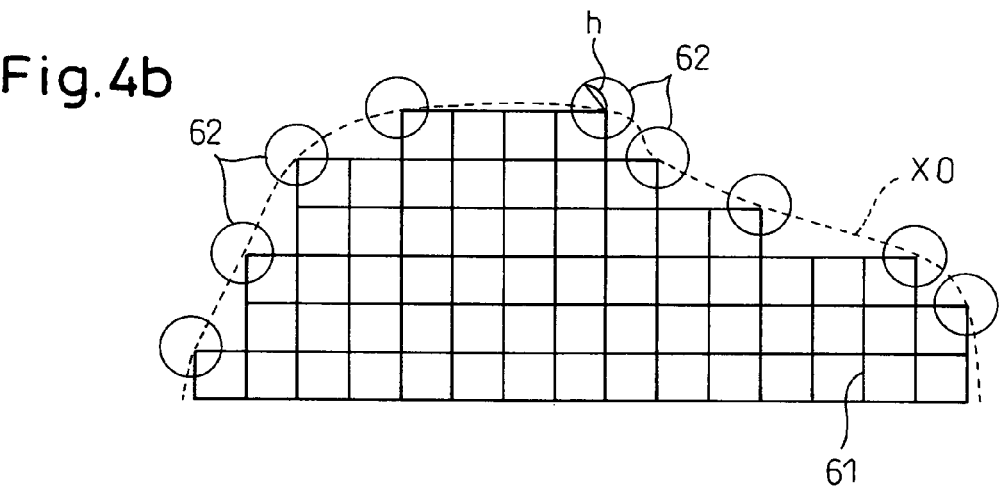
FIG. 4b is a second view explaining a calculation method of calculating an arriving range from an operating range.
Figure 4C:
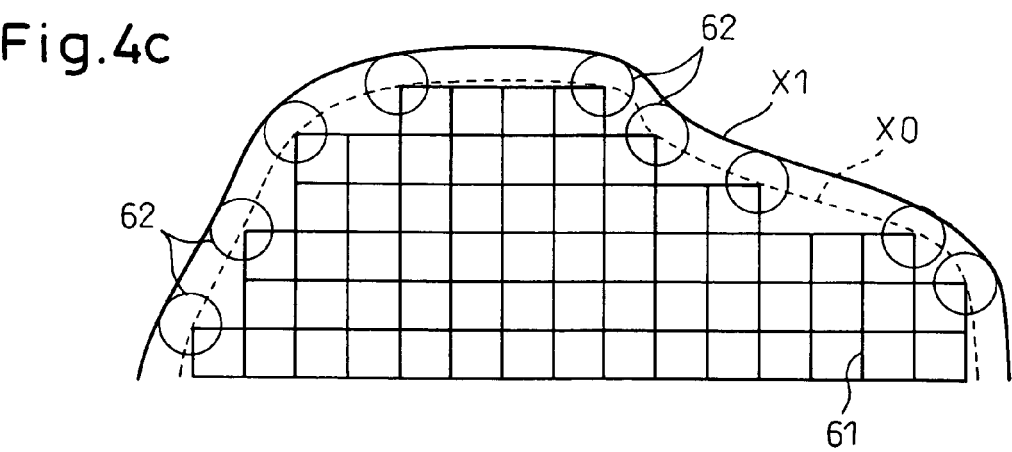
FIG. 4c is a third view explaining a calculation method of calculating an arriving range from an operating range.

FIG. 3 is a flow chart showing an action of a robot control unit of the present invention. FIGS. 4a to 4c are views for explaining a calculation method of calculating an arriving range from an operating range. Referring to FIGS. 3 and 4, operation of the robot control unit 30 of the present invention will be explained below. In this connection, before the flow chart shown in FIG. 3 is executed, an operator has already set an operating range X0 of the robot 20 through the teaching control panel 40.

In step 101 of FIG. 3, first, the operating range X0 is displayed on LCD 41 of the teaching control panel 40. Then, as shown in FIG. 4a, the three-dimension lattice 61 of predetermined dimensions is arranged in the operating range X0 an LCD 41. This three-dimension lattice 61 is arranged being inscribed with the operating range X0.

Then, in step 102, at each vertex of the three-dimension lattice 61, the inertial running distance h is added. Specifically, as shown in FIG. 4b, the sphere 62, the radius of which corresponds to the inertial running distance h, is arranged at each vertex. In this connection, for an object of simplification, in FIG. 4b, the sphere 62 is arranged only at the vertex of the entire three-dimension lattice 61.

Figure 5:
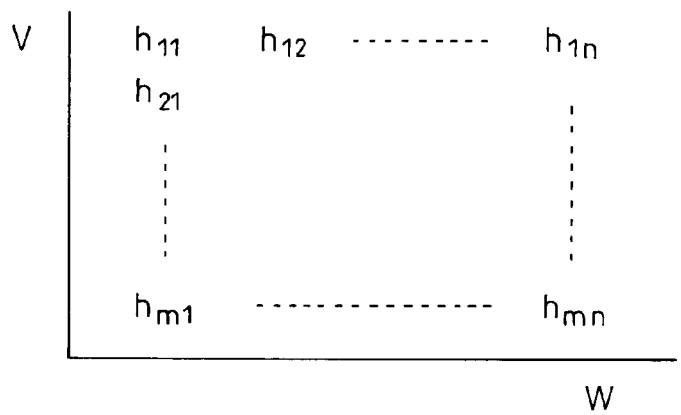
FIG. 5 is a view showing a map of inertial running.

In this case, FIG. 5 is a view showing a map of the inertial running distance. As shown in FIG. 5, the inertial running distance h is previously determined in the form of a map as a function of the moving speed V of the robot 20 and the weight W of the working tool 21. The weight W of the working tool 21 is decided according to the content of working to be executed by the robot 20. The moving speed V of the robot 20 is calculated according to the position of the robot 20 periodically detected by the position detector 26. The inertial running distance h is found from the map shown in FIG. 5.

In the case where a hand (not shown) is attached instead of the working tool 21, the inertial running distance h is found as a function of the moving speed V of the robot 20 and the total weight of the hand and a workpiece (not shown) held by the hand. In this connection, the inertial running distance h, which is inputted from the teaching control panel 40 by an operator, may be used.

Then, in step 103, the arriving range X1, to which the inertial running distance h is added, is calculated. Specifically, the arriving range X1 is calculated so that it can be circumscribed with all of the plurality of spheres 62 shown in FIG. 4c and displayed on LCD 41. As shown in the drawing, the calculated arriving range X1 is slightly larger than the operating range X0. The three-dimension lattice 61 and the spheres 62 are arranged and the arriving range X1 is calculated as described above by the arriving range calculation means 36 of the robot control unit 30. Then, in step 104, the three-dimension lattice 61 and the spheres 62 are erased and the arriving range X1 and the operating range X0 are displayed on LCD 41.

Figure 6:
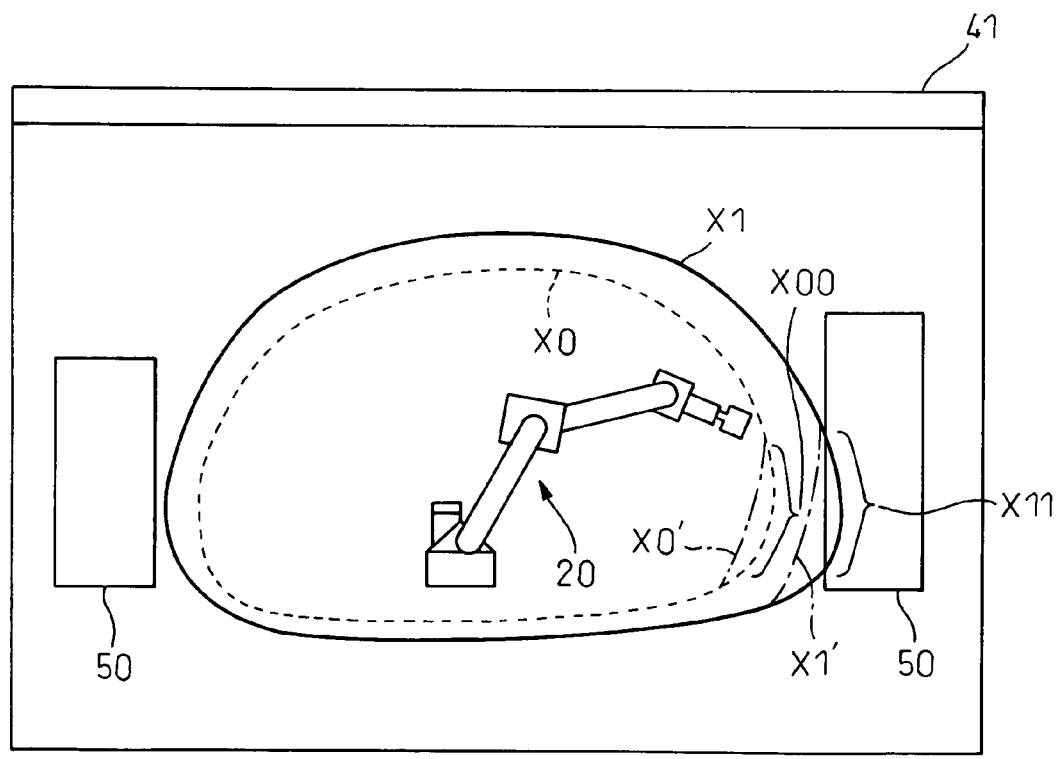
FIG. 6 is a view showing an operating range and an arriving range, which have been set, of a robot.

FIG. 6 is a view showing an operating range and an arriving range which have been set in the robot. In FIG. 6, in addition to the arriving range X1 and the operating range X0, the robot 20 and the peripheral devices 50, which are arranged on the right and left side of the robot 20, are also displayed on LCD 41.

In step 105, the interference confirmation means 37 confirms whether or not the arriving range X1 interferes with the peripheral devices 50. In FIG. 6, since a portion X11 of the arriving range X1 is drawn on the right peripheral devices 50, there is a possibility that the robot 20 interferes with the peripheral device 50 on the right side in this one portion X11. One portion X11 in the arriving range X1 is referred to as an interference portion X11 hereinafter.

In this case, an operator adjusts the operating range X0, which has been once set, according to the arriving range X1. Since both the arriving range X1 and the operating range X0 are displayed on LCD 41, the operator can easily adjust the operating range X0 referring to the arriving range X1. Accordingly, it is easy for the operator to remove the interference caused between the robot 20 and the peripheral devices 50.

The operating range X0 may be automatically adjusted by the automatic adjustment means 38 of the robot control unit 30. In the case described above, the program proceeds to step 106. In step 106, the operating range X0 is automatically changed by the automatic adjustment means 38 depending on the interference portion X11.

Specifically, operation is executed as follows. One portion X00 of the operating range X0 corresponding to the interference portion X11 is extracted. Then, this one portion X00 is moved toward the robot 20 by a predetermined small distance Δh. Due to the foregoing, the new operating range X0' is made. After that, the program returns to step 101 and repeats the above process.

In the case where it has been judged in step 105 that interference is caused in the new arriving range X1', the program proceeds to step 106 and one portion X00' corresponding to the interference portion X11' of the arriving range X1' is further moved toward the robot 20 by the small distance Δh. As described above, the above processing is repeated until a new interference portion is not generated. Due to the foregoing, it is unnecessary for an operator to adjust the operating range X0 to the operating range X0'.

As described above, in the present invention, the arriving range X1, in which consideration is given to the inertial running distance h, is calculated by the arriving range calculation means 36. In the case where interference with the peripheral devices 50 is made, the operating range X0 is adjusted according to the arriving range X1. Therefore, in the present invention, it is possible to previously avoid the occurrence of collision of the working tool 21, etc., of the robot 20 with the peripheral devices 50.

In the embodiment explained by referring to the drawings, when the spheres 62 are arranged at the vertexes of the three-dimension lattice 61, the arriving range calculation means 36 calculates the arriving range X1. However, the arriving range X1, in which consideration is given to the inertial running distance h, may be calculated by another method.

The emergency stopping means 34 shown in FIG. 2 is started when each shaft of the robot 20 and the working tool 21 deviate from the operating range X0 at the time of the actual operation of the robot 20. Due to the foregoing, supply of electric power to the servo amplifier 35 is shut off. As a result, the servo motor 25 receives no electric power and the robot 20 is stopped. Therefore, the emergency stopping means 34 can prevent the working tool 21 etc. of the robot 20 from actually colliding with the peripheral devices 50.

Figure 7:
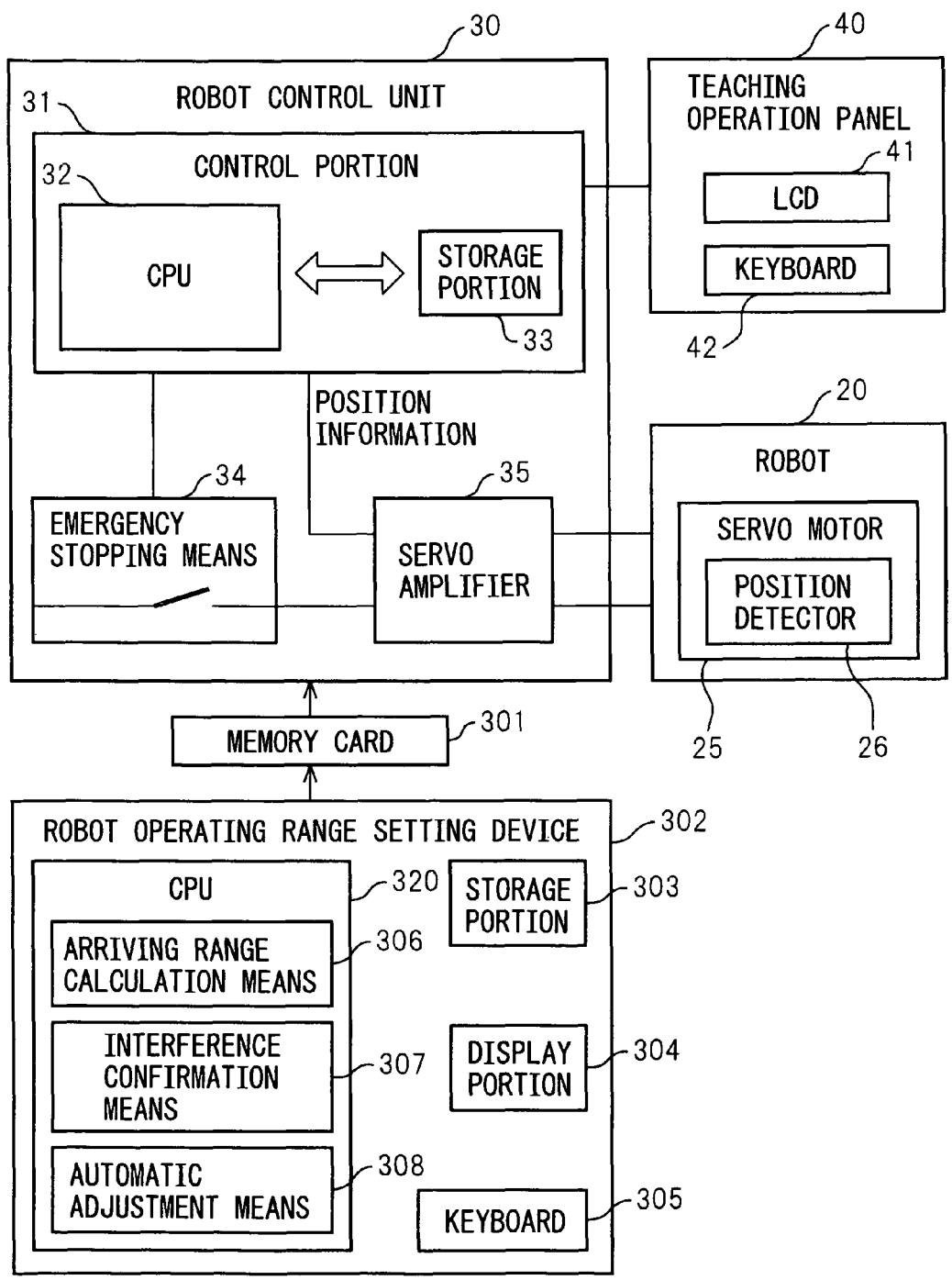
FIG. 7 is a schematic diagram showing another embodiment of a robot system having a robot control unit of the present invention.

FIG. 7 is a schematic diagram showing another embodiment of a robot system having a robot control unit of the present invention. In this embodiment, the robot control unit 30 and the robot operating range setting device 302 are devices different from each other. The robot operating range setting device 302 is connected to the robot control unit 30.

As shown in the drawing, the robot operating range setting device 302 includes: CPU 320; a storage portion 303; a display portion 304; and a keyboard 305. CPU 320 includes: an arriving range calculation means 306; an interference confirmation means 307; and an automatic adjustment means 308.

An operator can set an operating range through the keyboard 305. Through the keyboard 305, the operator can input and change an inertial running distance h, data of dimensions of the robot 20 arm, data of dimensions of accessories of the robot 20 and data of dimensions of the peripheral devices 50. In this connection, the inputted various data are stored in the storage portion 303 of the robot operating range setting device 302.

The arriving range calculation means 306, the interference confirmation means 307 and the automatic adjustment means 308 shown in FIG. 7 are respectively the same as the arriving range calculation means 36, the interference confirmation means 37 and the automatic adjustment means 38 shown in FIG. 2. In other words, the arriving range calculation means 306 calculates an arriving range from data stored in the storage portion 303. Then, the arriving range X1 and the operating range X0 are displayed in the display portion 304. The interference confirmation means 307 confirms whether or not the arriving range X1 interferes with the peripheral devices 50. Further, the automatic adjustment means 308 automatically changes the operating range X0 according to the interference portion X11.

The robot operating range setting device 302 can save data, which are stored in the storage portion 303, in the memory card 301. The robot control unit 30 can read in data, which are saved in the memory card 301, and accommodate the data in the storage portion 33.

In the case where positions of each shaft of the robot 20 and the working tool 21 deviate from the operating range stored in the storage portion 33 at the time of actually operating the robot 20, CPU 32 of the robot control unit 30 starts the emergency stopping means 34. Due to the foregoing, supply of electric power to the servo amplifier 35 is shut off. As a result, the servo motor 25 receives no electric power and the robot 20 is stopped. Therefore, the emergency stopping means 34 can prevent the working tool 21 of the robot 20 from actually colliding with the peripheral devices 50.

The present invention has been explained above referring to a typical embodiment. However, variations, omissions and additions can be made by those skilled in the art without departing from the scope of the claim of the present invention.

The invention claimed is:

1. A robot operating range setting device comprising:
   a setting arrangement for setting operating ranges of each shaft and a working tool of the robot;
   a storage arrangement for storing an inertial running distance of the robot decided by at least one of the operating speed of the robot and the weight of the working tool;
   an arriving range calculation arrangement for calculating an arriving range to which the each shaft and the working tool of the robot arrives according to the operating range, which has been set by the setting arrangement, and the inertial running distance stored by the storage arrangement;
   an interference confirmation arrangement for confirming whether or not the arriving range calculated by the arriving range calculation arrangement includes an interference portion, in which the arriving range interfere with the peripheral portion of the robot; and
   an adjustment arrangement for adjusting the operating range of the each shafts and the working tool of the robot if the interference confirmation arrangement confirms that the arriving range includes the interference portion;
   wherein the adjustment arrangement makes a new operating range by extracting one portion of the operating range corresponding to the interference portion and moving the one portion toward the robot by a predetermined distance and adjusts the operating range of the working tool.

2. The robot operating range setting device according to claim 1, further comprising a display arrangement for displaying the arriving range calculated by the arriving range calculation arrangement.

3. The robot operating range setting device according to claim 1, wherein the adjustment arrangement repeats to make the new operating range until the new arriving range calculated by the arriving range calculation arrangement based on the new operating range does not include the interference portion.

4. The robot operating range setting device according to claim 1, wherein the arriving range calculation arrangement arranges a three-dimension lattice of the predetermined dimensions to be inscribed with the operating range on the display arrangement, arranges a sphere, a radius of which corresponds to the inertial running distance, at each vertex of the three-dimension lattice and calculates the arriving range so that the arriving range is circumscribed with all of the spheres.

* * * * *